Sept. 8, 1936.   S. SAITO ET AL   2,053,302
BRAKE APPARATUS FOR A WHEEL
Filed Aug. 4, 1934
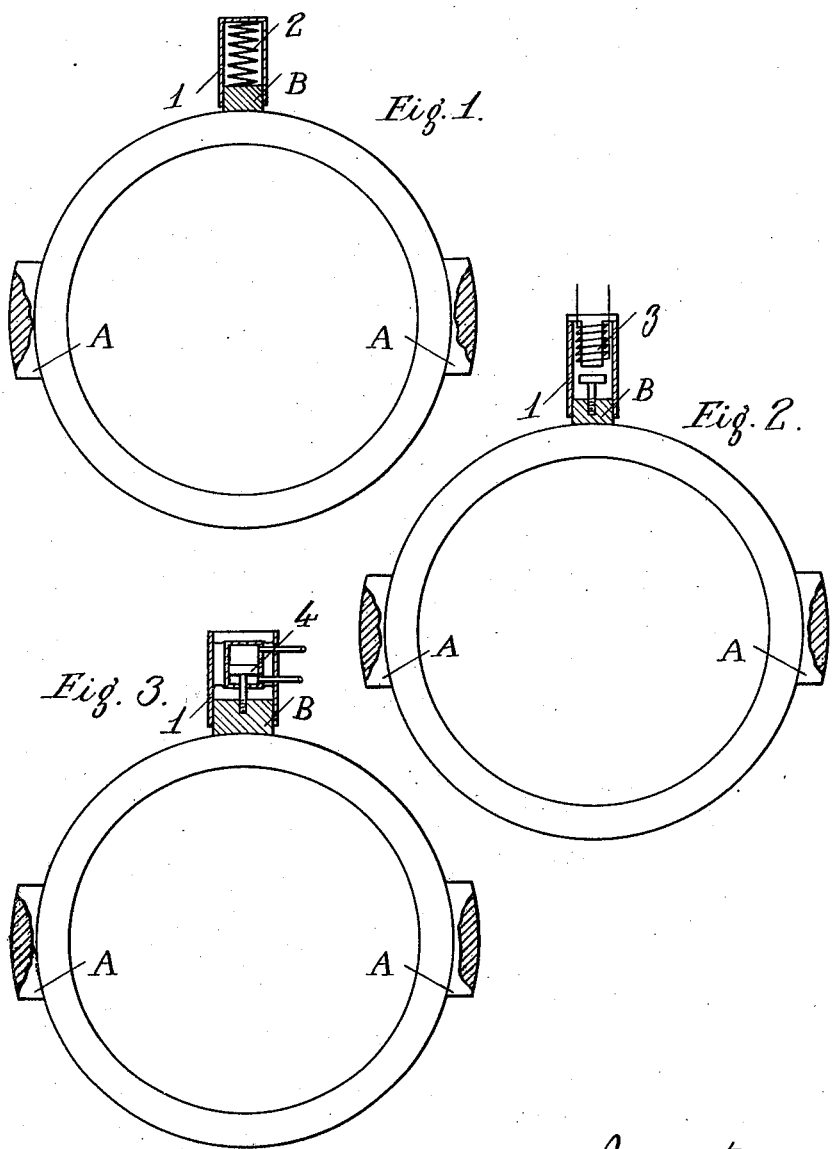

Patented Sept. 8, 1936

2,053,302

UNITED STATES PATENT OFFICE 2,053,302

BRAKE APPARATUS FOR A WHEEL

Seizo Saito, Toyonaka-Cho, and Nobutaka Yamamoto, Osaka, Japan

Application August 4, 1934, Serial No. 738,512
In Japan August 17, 1933

4 Claims. (Cl. 188—33)

This invention relates to a brake apparatus for a wheel consisting of one or more brake-shoes made of steel accompanied by a means which may press the shoes to the wheel in use, and one or more contact pieces made of a material other than steel, which may not serve as a lubricant per se, accompanied by a means which may keep the pieces in contact with the wheel continuously or intermittently.

It is described in the pending patent application, Ser. No. 646,558, dated December 9th, 1932, that the abrasion of brake shoes is far lessened in case where a pair of brake shoes made respectively of different materials are used for a wheel compared with the case where a pair of brake shoes of the same material are used. Now it has been found that the abrasion of brake shoes and wheels can be more lessened when one or more brake shoes are made of steel and a contact piece or pieces, which does not act as a brake shoe or shoes, made of a material other than steel are employed for a wheel, the piece or pieces being kept in contact continuously or intermittently with the wheel. The theory of this phenomenon is not fully clear, but the effect has been, and can be, proved by experiments.

This invention is based upon the above said investigations. According to this invention, a brake shoe or shoes made of steel, either carbon steel or alloy steel, are used so as to be pressed to a wheel as usual, and a contact piece or pieces are used on the wheel in such a manner that they can be lightly pressed to the wheel continuously or intermittently, by means of a pressure-exerting device such as springs, weights, etc. The contact piece should be made of a material other than steel, which may not serve as a lubricant per se, for example, grey cast iron, lead, tin, zinc, wood, asbestos, hard rubber, resinous compounds, fibrous materials, bituminous materials, and carbon either formed with binding material as clay or a natural one as charcoal.

The accompanying drawing shows three examples of the brake apparatus according to this invention.

Fig. 1 is a diagrammatical elevation of a wheel with steel shoes and a grey cast-iron contact piece which is continuously in contact with the wheel.

Figs. 2 and 3 are similar views wherein a contact piece is intermittently in contact with the wheel. In the drawing the same reference number indicates the same or similar part.

In Figs. 1 to 3, A is a brake shoe made of steel which is operated in the known manner when the wheel is braked, and B is a contact piece made of grey cast-iron.

The contact piece is slidably fitted to a guide cylinder 1 which is held on the axle box of the wheel, not shown.

2 is a spring mounted on the contact piece provided in the guide cylinder, which always presses the contact piece on the tire of the wheel.

3 is an electric magnet provided in the guide cylinder, which pulls the contact piece while electric current is passing in the coil, so that the piece is kept from contact with the wheel.

4 is an air cylinder the piston therein being connected with the contact piece provided in the guide cylinder. In this manner the contact piece is controlled in its contact with the wheel by compressed air which is manually admitted from its source.

According to the devices shown in Figs. 2 and 3, the contact piece can be simultaneously put in contact with the wheel in case the electric current for the main motors of the car is cut off or compressed air is admitted to the brake apparatus.

Lubricating material such as graphite is generally applied to a sliding surface in order to avoid the abrasion of the material, but such a lubricating material cannot be applied to the surface of a brake shoe, because the coefficient of friction at the surface is decreased so that a sufficient braking effect cannot be obtained.

In this invention, however, a material which may not serve as a lubricant per se is applied to the surface of the wheel, therefore coefficient of friction is in no way decreased giving any influence to the braking effect but greatly lessening the abrasion of the brake shoes and wheel.

The same result can be obtained when brake shoes made of malleable cast iron are used instead of steel shoes, because malleable cast iron has similar properties to those of steel.

The drawing only shoes some typical examples of this invention, and several other modifications can be carried out according to the principle of this invention, so that this invention is not limited to these examples.

What we claim is:

1. A brake apparatus for a wheel, comprising a brake shoe made of a material selected from the group consisting of steel and malleable cast iron, means for pressing said shoe against said wheel for braking purposes, a grey cast-iron contact piece, and means for maintaining said contact piece lightly in contact with the wheel, to prevent excessive wear of said brake shoe.

2. A brake apparatus for a wheel, comprising a brake shoe made of malleable cast iron, means for pressing said shoe against said wheel for braking purposes, a grey cast-iron contact piece, and means for maintaining said contact piece lightly in contact with the wheel to prevent excessive wear of said brake shoe.

3. A brake apparatus for a wheel, comprising a steel brake shoe, means for pressing said shoe to the wheel when in use, a grey cast-iron contact piece, and means for maintaining said contact piece lightly in contact with the wheel, to prevent excessive wear of said brake shoe.

4. A brake apparatus for a wheel, comprising a steel brake shoe, means for pressing said shoe to the wheel when in use, a grey cast-iron contact piece, and means for intermittently and lightly contacting said contact piece with the wheel, to prevent excessive wear of said brake shoe.

SEIZO SAITO.
NOBUTAKA YAMAMOTO.